United States Patent
Graser et al.

(10) Patent No.: US 8,260,897 B2
(45) Date of Patent: Sep. 4, 2012

(54) SYSTEM AND METHOD FOR AUTOMATICALLY MANAGING IT-RESOURCES IN A HETEROGENEOUS ENVIRONMENT

(75) Inventors: Thomas Graser, Leonberg (DE); Norbert Lenz, Magstadt (DE); Markus Mueller, Eutingen (DE); Juergen Schneider, Althengstett (DE)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 12/088,313

(22) PCT Filed: Aug. 3, 2006

(86) PCT No.: PCT/EP2006/065012
§ 371 (c)(1),
(2), (4) Date: Mar. 27, 2008

(87) PCT Pub. No.: WO2007/039337
PCT Pub. Date: Apr. 12, 2007

(65) Prior Publication Data
US 2008/0256241 A1    Oct. 16, 2008

(30) Foreign Application Priority Data
Sep. 29, 2005 (EP) .................................. 05109006

(51) Int. Cl.
*G06F 15/173* (2006.01)
(52) U.S. Cl. ...................................................... 709/223
(58) Field of Classification Search .................. 709/223, 709/226
See application file for complete search history.

(56) References Cited

U.S. PATENT DOCUMENTS

| | | | | |
|---|---|---|---|---|
| 5,889,953 A | * | 3/1999 | Thebaut et al. | 709/221 |
| 6,151,583 A | * | 11/2000 | Ohmura et al. | 705/8 |
| 6,509,912 B1 | * | 1/2003 | Moran et al. | 715/762 |
| 6,606,658 B1 | | 8/2003 | Uematsu | |
| 7,194,543 B2 | * | 3/2007 | Robertson et al. | 709/226 |

(Continued)

OTHER PUBLICATIONS

International Search Report; International Application No. PCT/EP2006/065012; International Filing Date: Nov. 28, 2006; Date of Mailing: Dec. 6, 2006;3 pages.

*Primary Examiner* — Jason Recek
(74) *Attorney, Agent, or Firm* — Cantor Colburn LLP; William A. Kinnaman, Jr.

(57) ABSTRACT

The present invention provides a system and method for automatically managing IT-resources in a heterogeneous environment on each level of resource abstraction and resource hierarchy by using the concept of the resource-reference object. The resource-reference object represents the link to a referenced resource on a lower level in the hierarchy and may include a priority value assigned by the respective level of hierarchy as well as all information to build a remote request to that referenced resource which may be a single resource or a resource group. Concurrently each resource-reference object itself is accessible from the higher level of hierarchy as an own resource by additional providing a name and a desired state which can differ from desired state of the referenced resource as well as making it externally visible. Resource-reference objects can be grouped to resource groups on the higher level of hierarchy, wherein those resource groups are addressable as own resource-reference object from the next higher level of hierarchy.

By using the inventive concept of the resource-reference object conflicts between different levels of hierarchies in the system management are resolved by a conflict resolution method using the priority assigned to the resource reference object by the respective level of hierarchy.

15 Claims, 4 Drawing Sheets

U.S. PATENT DOCUMENTS

| | | | |
|---|---|---|---|
| 7,475,419 B1* | 1/2009 | Basu et al. | 726/2 |
| 7,925,729 B2* | 4/2011 | Bush et al. | 709/223 |
| 2002/0046281 A1* | 4/2002 | Cope | 709/227 |
| 2002/0087734 A1* | 7/2002 | Marshall et al. | 709/310 |
| 2002/0191602 A1* | 12/2002 | Woodring et al. | 370/389 |
| 2004/0039798 A1* | 2/2004 | Hotz et al. | 709/219 |
| 2004/0040031 A1* | 2/2004 | Sweitzer et al. | 719/328 |
| 2004/0143664 A1 | 7/2004 | Usa et al. | |
| 2004/0153875 A1* | 8/2004 | Amyot et al. | 714/47 |
| 2004/0230943 A1 | 11/2004 | Pourheidari et al. | |
| 2004/0237094 A1 | 11/2004 | Vambenepe et al. | |
| 2005/0071273 A1* | 3/2005 | Vroman et al. | 705/51 |
| 2005/0210227 A1* | 9/2005 | Emerson et al. | 713/1 |
| 2005/0268284 A1* | 12/2005 | Clemm et al. | 717/121 |
| 2006/0015603 A1* | 1/2006 | Jakobson et al. | 709/223 |
| 2006/0031856 A1* | 2/2006 | Hasha et al. | 719/330 |
| 2006/0041660 A1* | 2/2006 | Bishop et al. | 709/224 |
| 2006/0173984 A1* | 8/2006 | Emeis et al. | 709/223 |
| 2006/0224436 A1* | 10/2006 | Matsumoto et al. | 705/10 |
| 2006/0259499 A1* | 11/2006 | Moulckers et al. | 707/100 |
| 2008/0253551 A1* | 10/2008 | Gray et al. | 379/211.01 |

* cited by examiner

SYSTEM AND METHOD FOR AUTOMATICALLY MANAGING IT-RESOURCES IN A HETEROGENEOUS ENVIRONMENT

FIELD OF THE INVENTION

The present invention relates in general to the field of system management of IT-resources in a heterogeneous environment. In particular it relates to a system and method for automatically managing such IT-resources in a heterogeneous environment with a multi-level hierarchy of management domains.

BACKGROUND OF THE INVENTION

Modern large enterprises are using complex IT infrastructures. In these enterprises there exist different roles and responsibilities in the usage and management of these IT-infrastructure and the underlying IT-resources. IT Systems Management solutions (management solutions) must support these organizational structures allowing different views and operations to the managed IT-resources. Due to these different views, roles and responsibility there may be conflicts in operating on such IT-resources. Therefore there is the need to resolve these potential conflicts.

Furthermore enterprises are organized in hierarchies of departments and people. If you go up this hierarchy the scope of the responsibility will increase, while the knowledge of the details is getting less relevant. However between the boundaries of such organizational units, there is an established understanding and translation of orders and a way the execution is reported back.

Systems Management processes can be automated to a certain degree by using management solutions. When multiple different management solutions are put together to provide a Systems Management solution, it is desirable to support the problem areas described above.

PRIOR ART

Historically many System Management solutions have a specific scope. For different levels of a hierarchy, different management solutions and they are not integrated and cannot communicate quite well. An example for such a hierarchy is for example a monitoring product on the lowest level, an automated operations product on the next level, and a business systems management product on the next level. There is no automatic translation when request or orders are passed down and acknowledgements are reported back (see FIG. 1A).

Bridging management layers today is often a manual process. It is either performed by humans mapping and translating requests or it is performed by proprietary software programs or scripts doing the job. While the managers on different levels of hierarchies of management domains can certainly communicate with each other, additional things are needed on top, e.g. to transfer control between these managers on different hierarchy levels and to support different naming conventions.

Technically there is known a concept of a proxy resource, which merely offers a local interface to a resource of interest. But the concept of having a proxy resource is too weak and actually does not really translate between the different hierarchy levels. A proxy resource only builds an infrastructure to communicate between different levels of hierarchies of management domains, but it does not support different levels of abstraction. Also the concept of a proxy resource does not support the notion, that different management domains may have conflicting goals when managing a specific resource.

A significant problem of the existing prior art in the system management of IT-infrastructures with heterogeneous platforms/domains is the interoperation between different level of hierarchies of management domains and abstraction layers.

OBJECTS OF THE PRESENT INVENTION

It is object of the present invention to provide a method and system for automatically managing IT-resources in a heterogeneous environment with a multi-level hierarchy of management domains avoiding the problems of the prior art.

SUMMARY OF THE PRESENT INVENTION

The present invention provides a system and method for automatically managing IT-resources in a heterogeneous environment with a multi-level of hierarchy of management domains by using the concept of the resource-reference object. The resource-reference object represents the link to a referenced resource on a lower level in the hierarchy and may include a priority value assigned by the respective level of hierarchy as well as all information to build a remote request to that referenced resource which may be a single resource or a resource group. Concurrently each resource-reference object itself is accessible from the higher level of hierarchy as an own resource by additional providing a unique name and a desired state which can differ from desired state of the referenced resource as well as making it externally visible. Resource-reference objects can be grouped to resource groups on the higher level of hierarchy, wherein those resource groups are addressable as own resource-reference object from the next higher level of hierarchy.

By using the inventive concept of the resource-reference object conflicts between different levels of hierarchies of management domains in the system management are resolved by a conflict resolution method using the priority assigned to the resource reference object by the respective level of hierarchy.

BRIEF DESCRIPTION OF THE DRAWINGS

The present invention is illustrated by way of example and is not limited by the shape of the figures of the drawings in which:

FIG. 1A shows a typical high availability cluster which may be preferably managed by a system/method according to the present invention. The cluster is a set of nodes 1-3. These nodes 1-3 host resources (DB—databases) which are constantly monitored by a Local Resource Manager (LRM). In case of failures the LRM notifies the cluster manager. The cluster manager generates a set of recovery actions for the LRMs and the LRMs start and stop resources accordingly. The cluster manager allows to define resource groups (Group: DB2_failover) which are treated as an entity from system management point of view. These resource groups represent a resource abstraction that means it offers the same manageability interface as a single resource.

FIG. 1B shows a typical multi-level hierarchy of management domains which may be preferably managed by a method/system according to the present invention. A management domain is a set of resources managed by an instance of a management solution. The cluster (C1; C2) is an example of a management domain (first level hierarchy of management domain) and its cluster manager represents the management solution.

A subset of resources in the cluster is exposed to next higher management domain (second level of hierarchy of management domain; Banking application) and will be controlled by the automation manager of that management domain. The adapter provides the necessary mapping of commands from the automation manager to the respective cluster manger C1, C2. The automation manager is capable of grouping resources and can expose a subset of its resources through an adapter to a next higher management domain (Banking application). That management domain offers the same capabilities as the one before.

Figure 1A:
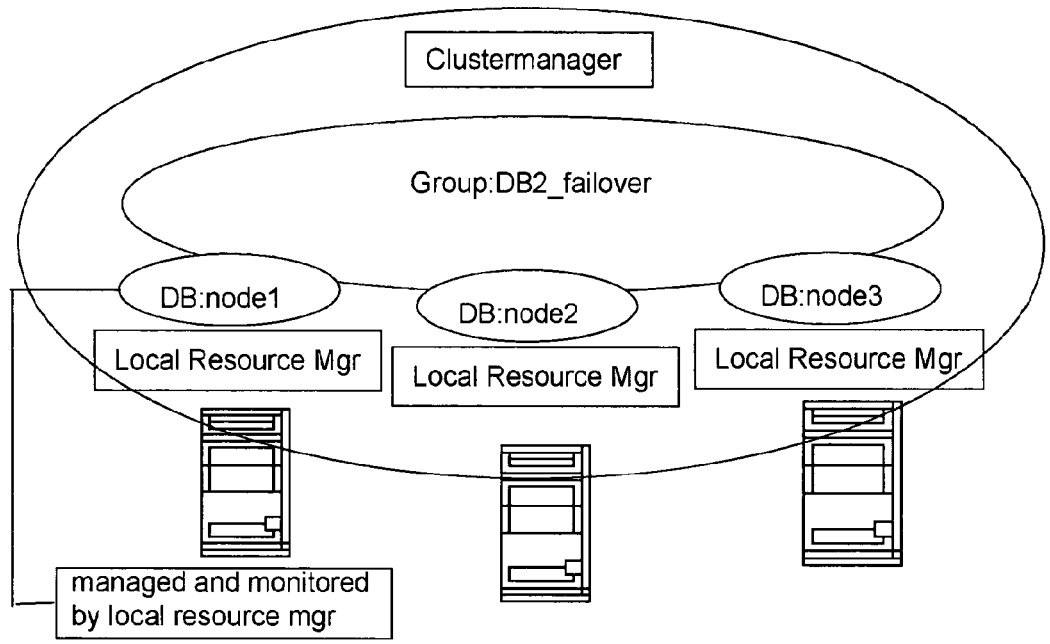
FIG. 1A shows a typical high availability cluster.
Figure 2A:
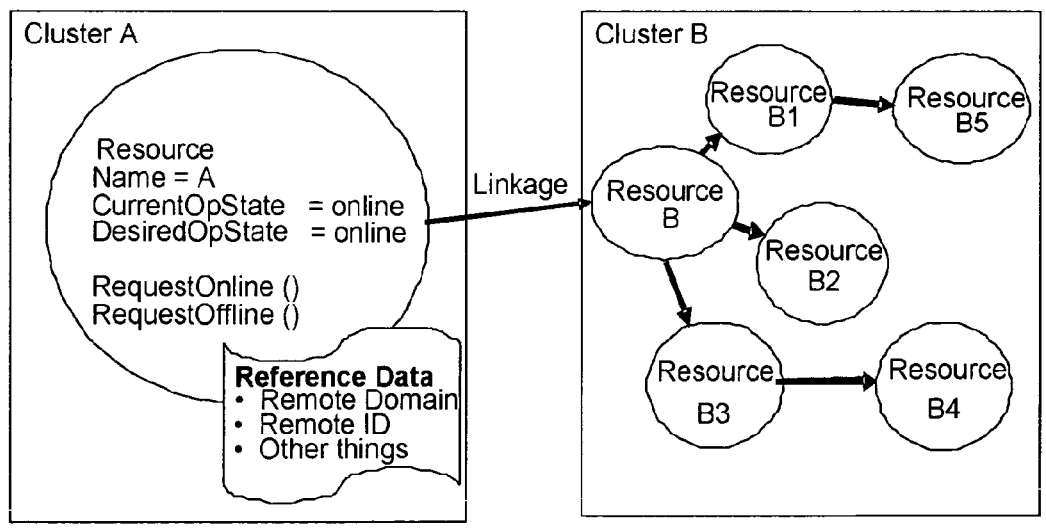
FIG. 2A shows basic structure of the inventive resource-reference object implemented in a system management infrastructure having two levels of hierarchies.

FIG. 2A shows basic structure of the inventive resource-reference object used in system management environment consisting of management domain A and management domain B, wherein management domain A is a higher level management domain.

The resource-reference object represents the link to a referenced resource B on a lower level in the hierarchy management domain—domain B—and may additionally include a priority value assigned by the respective level of hierarchy of management domain (not shown) as well as all information (Reference Data—e.g. remote domain, remote id, RequestOnline, RequestOffline) to build a remote request to that referenced resource which may be a single resource or a resource group.

Additionally each resource-reference object itself is accessible from the higher level (Domain A) of hierarchy of management domain as an own IT-resource by additional providing a name and a desired operational state (DesiredOpState) which can differ from the desired state of the referenced resource as well as making it externally visible. Resource-reference objects can be grouped to resource groups on the higher level of hierarchy of management domain (Domain A), wherein those resource groups are addressable as own resource-reference object from the next higher level of hierarchy (not shown).

Finally, a current operation state (CurrentOpState) is monitored by the management solution of the lower hierarchy of management domain which is concurrently reflected as a value (online, offline) in the resource reference object.

By using the inventive common concept of the resource-reference object conflicts between different levels of hierarchies of management domains in the system management are resolved by a conflict resolution algorithm using the priority assigned to the resource-reference object.

In more detail the inventive resource reference objects have two major characteristics:

For all practical purposes they have the same structure and behaviour as any other resource object in the end to end domain.

In case of Availability Management each resource and resource group has attributes like CurrentOpState or DesiredOpState and supports operations like RequestOnline or RequestOffline. These attributes and operations express the management interface. The management interface is specific to the management discipline. Typically all resource reference objects in a given domain have these attributes and operations, or at least a common subset of these attributes and operations. The resource reference objects representing the linkage do not differ in any way concerning the management interface from other resource objects.

The linkage information is typically a set of attributes allowing the management solution for domain A to build remote requests to the referenced IT-resource B in domain B. All data needed to build this request is part of this linkage information. It depends on the different use case and is not deeply architected in this patent. At least there is needed a name space switch, telling the domain A management solution the name and the domain of the remote referenced resource. The domain A management solution can use this information to query information on the remote domain for the referenced resource, subscribe to state changes of the remote resource, and trigger operations on the remote referenced resource.

This of course implies a certain infrastructure to support this interaction.

In a preferred embodiment a query of the remote referenced resource B can itself result in a traversal of other resources in the domain B for which the first referenced resource B is an anchor point. In the FIG. 2A, the management solution for domain A is now able to ask resource B (the referenced resource) about other related resources depicted as B1 to B5.

In a further embodiment the resource-reference object includes following information: name of the resource object (not the referenced resources themselves), current operational state, desired operational state, the reference data consisting of name and domain ID of the referenced resource. Additionally the following methods are supported: request online (start)-request offline (stop).

In a further embodiment the resource-reference object contains a compound state indicating the overall health of the resource, a suspend flag indicating the automation mode, an info link indicating which person to contact in the case of problem.

In a further embodiment the resource-reference object is rendered as an Enterprise Java Bean that contains the above mentioned information made accessible through getter and setter methods. In addition to this and the methods mentioned above, a reset from broken is offered.

In a further embodiment, the resource reference object can be serialized in a XML document and de-serialized from the XML-document.

The inventive resource-reference object compared to the prior art proxy pattern has the following advantages:

The name of the resource-reference object can be freely chosen. This will enable customer departments responsible for the different management domains to stick to naming rules and other external requirements.

The resource-reference object can exist without its counterpart, the referenced resource. This allows switching off a cluster or a low level management domain without affecting the functionality of the higher level automation manager.

Figure 2B:
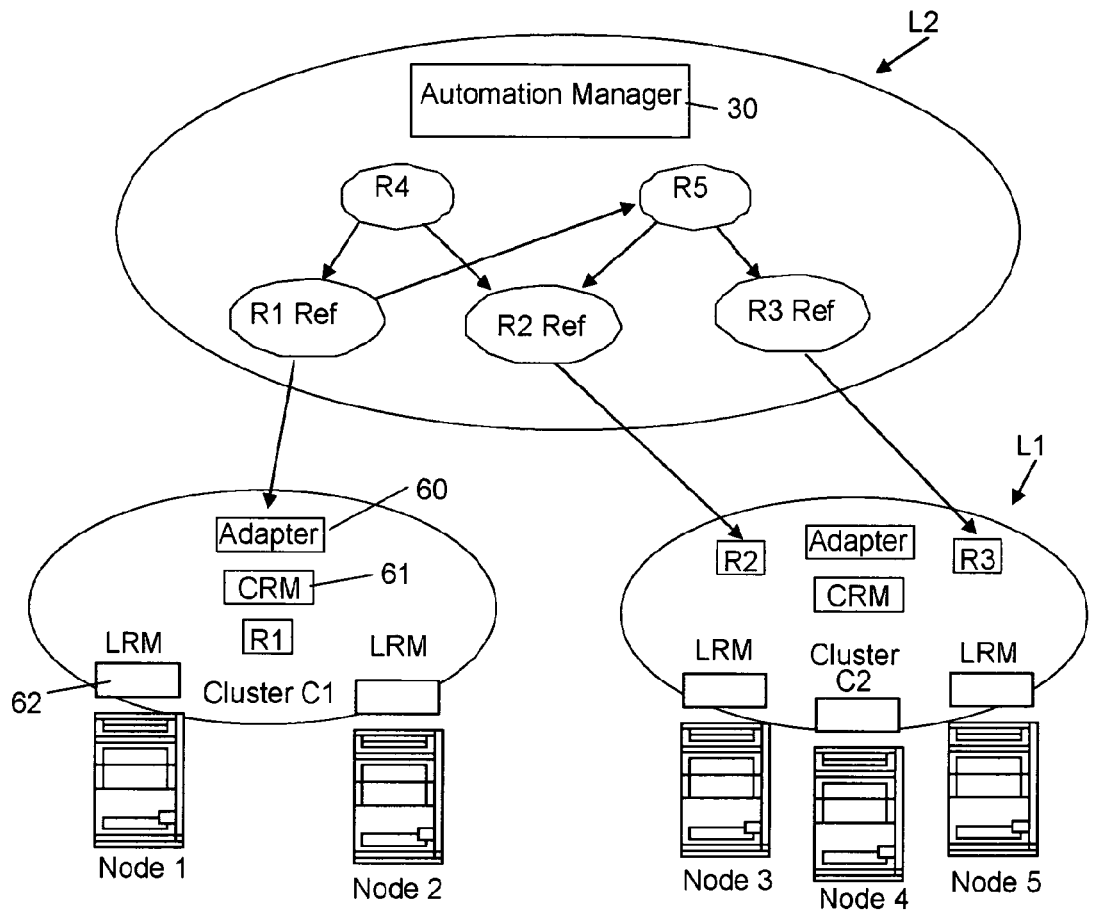
FIG. 2B shows the usage of the inventive resource-reference object in managing a multi-level hierarchy of management domains.

FIG. 2B shows the usage of the inventive resource-reference object in a multi-level hierarchy of management domains C1, C2, D. The multi-level hierarchy management domains consist of two clusters C1 (node 1-2) C2 (node 3-5)

hosting resources R1-R3 (first level of hierarchy of management domain L1), and a higher level management domain (second level of hierarchy of management domain L2). Each cluster C1, C2 is responsible for managing the resources it hosts by using a cluster resource manager (CRM 61). The cluster resource manager 61 uses the local resource manger LRM 62 for monitoring, starting and stopping resources R1-R3. In addition the cluster resource manager 61 provides interfaces to the adapter 60 assigned to the respective cluster C1, C2. The adapter 60 provides the necessary mapping of commands from the automation manager 30 to the respective cluster resource manger 61. The automation manager 30 which is assigned to the higher level management domain L2 is capable of grouping resources and can expose a subset of its resources through an adapter to a next higher management domain (not shown). That management domain offers the same capabilities as the one before. The higher level domain L2 hosts resources R4-R5 as well the resource reference objects R1Ref-R3Ref. The additional resources R4-R5 are resource groups defined in the automation configuration policy. Resource group R4 contains the members R1Ref, R2Ref and R5 contains R2Ref, R3Ref. R1Ref-R3Ref have structure as shown in FIG. 2A.

The concrete usage of the above mentioned resource reference object in a multi-level hierarchy of management domains is explained in more detail.

Let us define a management domain as the set of resources that a management solution needs to interact with. As already explained different management domains may be on different levels in a hierarchy. Also the resources in different management domains may have different levels of abstraction. The present invention teaches a simple technical way to bride between management domains by modelling the logical linkage between these domains as just another IT-resource. By doing so, certain management function to this IT-resource can be applied. Furthermore this IT-resource is customizable to reflect the customer needs. This way of modelling the logical linkage between management domains via IT-resources can be applied in a hierarchy all the way up to management functions with enterprise scope.

To be more concrete, it is provided a description limiting this enterprise model to one particular Systems Management discipline. In present invention the discipline is availability management.

This inventive resource reference model is more than today with a proxy resource concept is provided. It supports that the managers on different levels can have different views to 'shared' IT-resource at a certain point in time. For example, if the IT-resources have an attribute called "desired state", then the value of this attribute can be different in different management domains. If in one domain the "desired state" of an IT-resource is "online", then the request to activate that IT-resource could create a conflict in another management domain, where the "desired state" of that IT-resource is "offline". So each domain manager has its own interests, and there is a mechanism to arbitrate conflicting requests.

When allowing some kind of access of IT-resources from different management domains, there is a need to allow that some IT-resource attributes are domain specific and therefore can be hidden for other domains, should be translated (e.g. names) when domain boundaries are crossed, can have different values for the different domains at a certain point in time or can have different states from the point of view of different domain managers at a certain point in time.

The basic idea of the present invention is that the links between management domains is modelled as a resource reference object. These objects build the linkage between the various domains allowing translation of names and other attributes automatically. Key is that this new resource reference object behaves similar to other IT-resources in the management discipline. For example in the Availability Management space such resource reference objects can be integrated like any other resource into an enterprise wide resource relationship graph representing complete availability model.

Figure 2D:
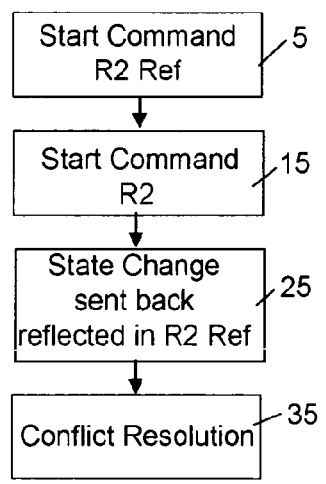
FIG. 2D shows a flow-diagram of the conflict resolution in case the cluster manager rejects the command from cross cluster manger.
Figure 2C:
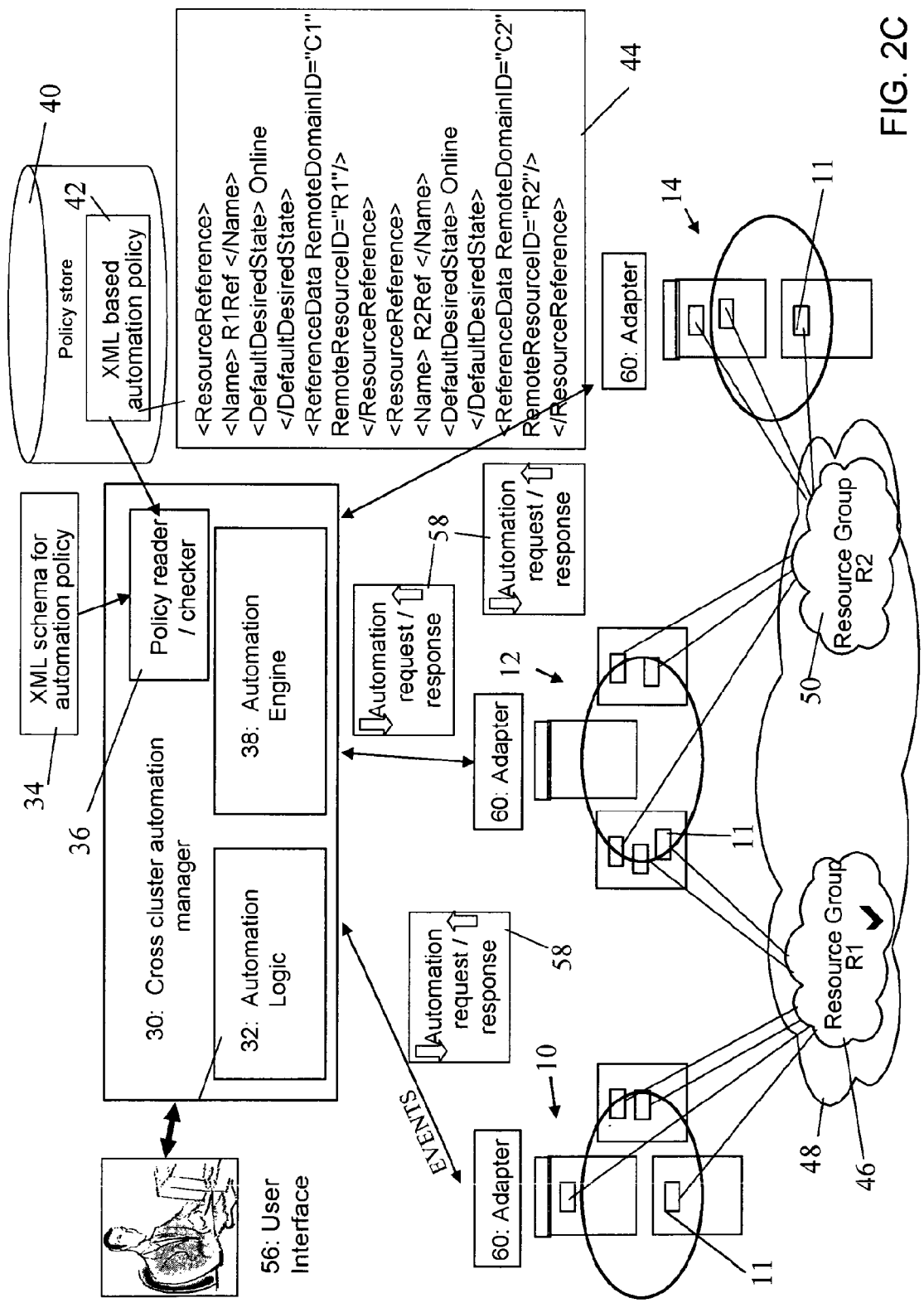
FIG. 2C shows a preferred implementation of the present invention in a system automation environment.

FIG. 2C shows the preferred implementation of usage of the common reference resource object in system automation environment. With general reference to the Figures and with special reference now to FIG. 2C preferred embodiment of the inventive method and system comprises an XML-based automation policy 42 the content of which is symbolised by an exemplary XML-implementation in frame 44. This XML-code implements the inventive resource-reference objects R1Ref, R2Ref as a part of an XML-based automation policy. This policy 42 is stored in a policy store 40 located somewhere in the network and being accessible by an operator and his interface 56.

Further, an XML-schema 34 is depicted, which describes permissible XML-based automation policy elements and is used to validate the correctness of the XML-based automation policy 42.

In more detail, a policy reader 36 is functionally connected to the automation policy 42, in order to have a read and possibly a write access to the policy store 40, in order to read and check an automation policy for syntactic and semantic errors.

With respect to the centre portion of FIG. 2C so-called cross cluster automation manager 30 is a software component comprising automation logic 32 and an automation engine 38. This cluster automation manager 30 sends automation requests depicted with reference number 58 to a respective cluster 10, 12, or 14. Such a request comprises code or at least interpretable commands having the semantic meaning to start or to stop, or to move etc., an application resource or a group of application resources 11 in a respective cluster 10, 12, 14. Further, the cross cluster automation manager 30 has respective I/O interfaces for receiving responses from the cluster's adapters 60 telling the cross cluster automation manager 30 whether a request was successful or not.

Figure 1B:
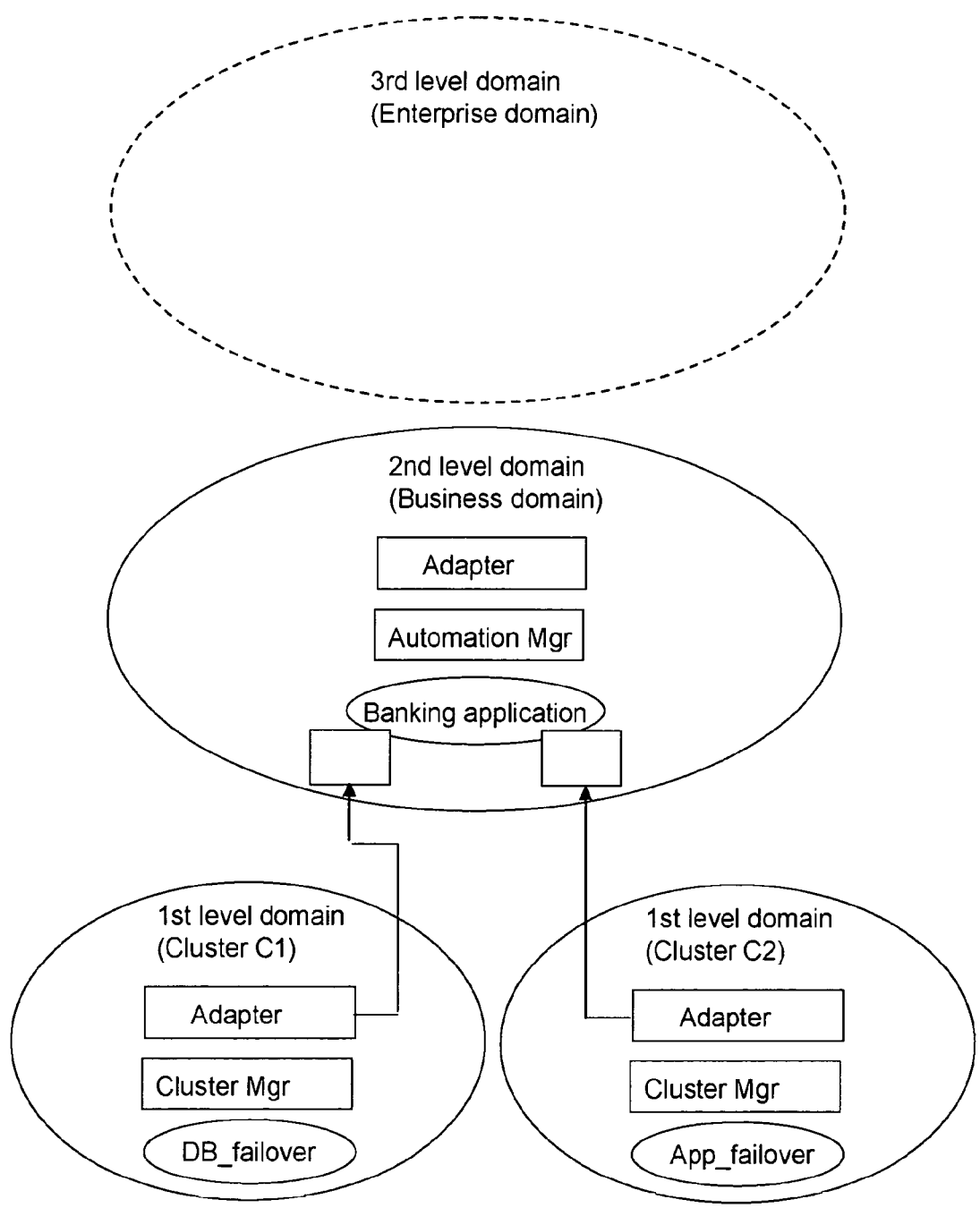
FIG. 1B shows a typical multi-level hierarchy of management domains.

It should be added that the adapter software 60 residing at each cluster 10, 12, 14 is the interface software, which interprets the requests sent by cross cluster automation manager 30 and interprets the commands comprised thereof, in order to address single resources 11 in a respective cluster 10, 12, 14. This function is executed by the cluster manager (not shown—see FIG. 1B) at each cluster 10, 12, 14, based on a mapping between the more general commands sent by the cross cluster automation manager 30 received by the cluster manager to the particular, specialised hardware and software component names residing in each cluster. Thus, assume a software component changes its name the new name is managed by adapter 60 in order to guarantee that a general command sent by the cross cluster automation manager 30 may be interpreted and correctly understood by adapter software 60.

Any state changes in each of the different clusters 10, 12, 14 are sent by the cluster manager to the cross cluster automation manager 30. Such state changes are referred to as "events", and are depicted as bidirectional arrows in FIG. 2C.

The cross cluster automation manager 30 allows monitoring the availability of distributed business critical applications running on multiple, possibly heterogeneous clusters and allows automatically operating these distributed applications. Such operations include the above-mentioned functions of starting, stopping or moving some resources 11.

The before-mentioned automation engine 38 performs the logic function of an abstract decision engine. In particular, it processes policy information by reading and evaluating it with respective background algorithms, listens to triggers such as resource state change events, to operator commands, or to scheduler-driven actions, or other events; it generates the above-mentioned automation requests and supervises the respective responses from a respective cluster 10, 12 and 14.

The automation logic 32 implements the semantics of the automation policy constructs in the automation engine 38 in an adequate format and programming language.

The local automation policies for the clusters 10, 12, 14 themselves are not required to be changed in order to be able to implement the invention. The only interface to the inventive part of the high-level cross cluster automation manager software is a respective adapter software 60.

With respect to the bottom portion of FIG. 2C a frame 48 contains two exemplary referenced resources, the resource group R1-46, and the resource group R2-50. Both 46, 50 represent a distributed application or a part of it.

It should be added that the different system clusters, for example mainframe cluster and distributed UNIX clusters comprise a local automation as already mentioned before. Further, the user interface 56 is preferably a GUI which is used by an operator in order to monitor and automatically operate the distributed applications. More details are described further below.

As a concrete example, let us assume that resource group R1 corresponds to a data base, e.g. DB2 while R2 corresponds to an application server, e.g. IBM Websphere Application Server. Both parts together are required to run a banking application which is defined in the automation policy 44 as a resource group containing resource reference objects R1Ref, R2Ref. R1 itself can be a basic resource group containing a Database application, data, and an IP address. Similarly R2 can contain an IBM Websphere Application server and an IP address. These mentioned groups in turn can contain resources like processes, IP addresses, file systems, disks etc. These resources can be automatically started and stopped, and there may be dependencies like start-order or stop-order. Also these resources have a location (a system or a node) where they may run.

In order to keep the banking application available the automation policy defines that the desired state of the banking application resource group is online. For a resource group to be online means that all its members are online. This strategy is laid down in the automation policy as a type of a resource group.

In order to reach that goal "banking application available" the cross cluster automation manager 30 forwards that goal to the automation engine 38 which holds all resource objects and the relationships between them as defined in the automation policy 44. The automation engine 38 based on the automation logic 32 as well as the type of the resource group interprets that goal to keep the members of the banking application resource group online. The automation engine 38 determines members R1Ref, R2Ref of the banking application group and generates start commands for them by using the reference information which is the remote domain as well as the remote ID as shown in FIG. 2A. The cross cluster automation manager 30 receives these commands and sends them to the respective adapter 60. The adapter 60 maps the commands to cluster specific commands.

Assuming the application server member R2 had been offline before and nothing is preventing it from starting then the operational state in the referenced resource R2 is about to be changed from offline to online. This state change is sent by the adapter 60 to the cross cluster automation manager 30 so that the reference resource object R2Ref can be updated by the automation engine 38 accordingly. This change is also reflected in the user interface 56.

Assuming the application server member R2 had been offline before and local operator does not allows its start then the cluster manager of the resource R2 applies a conflict resolution between the higher level hierarchy and the local goal lower level of hierarchy. Preferably the conflict is solved by a priority based decision whose implementations are up to the local cluster manager. If the start command from the higher level hierarchy looses then the adapter 60 informs the cross cluster automation manager 30 so that the reference resource object R2Ref is updated by the automation engine accordingly. In that preferred embodiment the operational state of R2Ref is changed from offline "Ok" to offline "start request not winning" and visually displayed in the user interface 56.

FIG. 2D shows a flow-diagram of the conflict resolution in case the cluster manager rejects the command from cross cluster manger. Referring the example given above a start command is generated for the R2Ref because the desired state is online and the operational state is "offline ok" (5). This leads to start command for R2 (15). Because of the assumption that the start command looses, this is reflected in a state change event for R2 with operational state "offline start request not winning" and desired state still offline (25). This state change event updates the operational state of R2Ref to offline "start request not winning". This state is shown on the user interface 56 and alerts the operator. In addition a workflow could be triggered so that the result of the conflict resolution made by the cluster manager is changed in favour of a higher level of hierarchy (35).

The present invention can be realized in hardware or a combination of hardware and software. An automation tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;
b) reproduction in a different material form.

The invention claimed is:

1. A system for automatically managing IT-resources in a multi-level hierarchy of management domains, wherein each management domain contains a set of resources managed by an assigned management solution, wherein each resource of said management domains is characterized by a resource name, a current operational state, and a desired operational state, wherein at least a subset of resources of a management domain of a lower level of said hierarchy is exposed to a management domain of a higher level of said hierarchy, wherein said system is implemented by a computer and comprises:
- an adapter for providing mapping of commands from the management solution of said management domain of said higher level of said hierarchy to the management solution of said management domain of said lower level of said hierarchy, said adapter ensuring that said commands issued from said higher level of said hierarchy reach one or more target components in said lower level of said hierarchy by the resource name of the resource executed by the one or more target components, even if said one or more target components changes its name;
- a linkage between different management domains using a resource reference object model, wherein each resource (referenced resource) of said subset of said resources of said management domain of said lower level of said hierarchy being exposed to said management domain of said higher level of said hierarchy is modeled as a resource reference object in said management domain of said higher level of said hierarchy, wherein said resource reference object additionally provides at least a priority of said management domain, and information for addressing said resource reference object as an IT-resource by said management domain of said higher level of said hierarchy and/or a management domain of a next higher level of said hierarchy;
- displaying means for displaying said resource reference object as an IT-resource in a graphical user interface; and
- a cluster manager in communication with the adapter for providing a conflict resolution for requests received from said different management domains, the conflict resolution comparing the priority of said different management domains.

2. A system according to claim 1, wherein said information for addressing said resource reference object comprises at least a unique ID of said resource reference object.

3. A system according to claim 1, wherein said resource reference object comprises at least a name of the resource reference object, a current operational state, a desired operational state, reference data including a name and an ID of the referenced resource(s), and information for generating start and stop commands for respective referenced resource(s).

4. A system according to claim 3, wherein said resource reference object further comprises a compound state indicating overall health of the resource, a suspend flag indicating an automation mode, and an info link indicating which person to contact in case of problems.

5. A system according to claim 1, wherein said resource reference object is referenced to a single resource or a group of resources.

6. A system according to claim 1, wherein said displaying means allows creating groups of resource reference objects which are exposed to a management domain of the next higher level of said hierarchy.

7. A system according to claim 1, wherein said resource reference object further includes a priority value assigned by the management domain to which said resource reference object is to be exposed.

8. A system according to claim 7, wherein said conflict resolution means is part of the management solution of said lower level of said hierarchy, and wherein said conflict resolution is based on the priority value included in said resource reference object and a priority value assigned to the management domain of said lower level of said hierarchy.

9. A system according to claim 1, wherein said resource reference object is rendered as an Enterprise Java Bean.

10. A system according to claim 1, wherein said resource reference object is encoded in XML.

11. A system according to claim 1, wherein at least one of said management domains contains a cluster of nodes or a group of clusters of nodes.

12. A computer-implemented method for automatically managing IT-resources in a multi-level hierarchy of management domains, wherein each management domain contains a set of resources managed by an assigned management solution, wherein each resource of said management domains is characterized by a resource name, a current operational state, and a desired operational state, wherein at least a subset of resources of a management domain of a lower level of said hierarchy is exposed to a management domain of a higher level of said hierarchy, wherein said method comprises the steps of:
- providing, by a computer, a mapping of commands from the management solution of said management domain of said higher level of said hierarchy to the management solution of said management domain of said lower level of said hierarchy, said mapping ensuring that said commands issued from said higher level of said hierarchy reach one or more target components in said lower level of said hierarchy by the resource name of the resource executed by the one or more target components, even if said one or more target components changes its name;
- modeling, by a computer, each resource (referenced resource) of said subset of said resources of said management domain of said lower level of said hierarchy being exposed to said management domain of said higher level of said hierarchy as a resource reference object in said management domain of said higher level of said hierarchy, wherein said resource reference object additionally provides at least a priority of said management domain, and information for addressing said resource reference object as an IT-resource by said management domain of said higher level of said hierarchy and/or a management domain of a next higher level of said hierarchy;
- displaying, by a computer, said resource reference object as an IT-resource in a graphical user interface; and
- providing, by a computer, a conflict resolution for requests received from said different management domains, the conflict resolution comparing the priority of said different management domains.

13. A method according to claim 12, wherein said conflict resolution is provided between said different management domains by using priority values assigned to said respective management domains, and wherein at least one of said priority values is included in said resource reference object.

14. A method according to claim 12, wherein said resource reference object comprises at least a name of the resource reference object, a current operational state, a desired operational state, reference data including a name and an ID of the referenced resource(s), and information for generating start and stop commands for respective referenced resource(s).

15. A computer program product stored on a non-transitory medium comprising computer readable program means for causing a computer to perform the method of claim 12 when said computer program product is executed on a computer.

* * * * *